(12) United States Patent
Simon (10) Patent No.: US 11,845,093 B2
(45) Date of Patent: Dec. 19, 2023

(54) FLUID PRODUCT DISPENSER

(71) Applicant: SHISEIDO INTERNATIONAL FRANCE, Paris (FR)

(72) Inventor: Bruno Simon, Boulay-les-Barres (FR)

(73) Assignee: SHISEIDO INTERNATIONAL FRANCE, Paris (FR)

( * ) Notice: Subject to any disclaimer, the term of this patent is extended or adjusted under 35 U.S.C. 154(b) by 0 days.

(21) Appl. No.: 17/604,041

(22) PCT Filed: Apr. 16, 2020

(86) PCT No.: PCT/FR2020/000132
§ 371 (c)(1),
(2) Date: Oct. 15, 2021

(87) PCT Pub. No.: WO2020/212663
PCT Pub. Date: Oct. 22, 2020

(65) Prior Publication Data
US 2022/0203393 A1 Jun. 30, 2022

(30) Foreign Application Priority Data
Apr. 17, 2019 (FR) ..................................... 1904116

(51) Int. Cl.
*B05B 11/00* (2023.01)
*B05B 11/10* (2023.01)
*F16B 37/08* (2006.01)

(52) U.S. Cl.
CPC ...... *B05B 11/1049* (2023.01); *B05B 11/1047* (2023.01); *F16B 37/0864* (2013.01); *B05B 11/0008* (2013.01)

(58) Field of Classification Search
CPC ............. B05B 11/1049; B05B 11/1047; B05B 11/0008; F16B 37/0864
See application file for complete search history.

(56) References Cited

U.S. PATENT DOCUMENTS 5,348,174 A * 9/1994 Velicka .................. B65D 83/38
220/915
5,799,810 A * 9/1998 de Pous ............... B65D 83/205
215/276

(Continued)

FOREIGN PATENT DOCUMENTS

| JP | 07-101480 A | 4/1995 |
| JP | 09-276758 A | 10/1997 |
| WO | 2009/150351 A1 | 12/2009 |

OTHER PUBLICATIONS

International Preliminary Report on Patentability with the translation of Written Opinion dated Sep. 28, 2021 from the International Bureau in International Application No. PCT/FR2020/000132.

(Continued)

*Primary Examiner* — Vishal Pancholi
(74) *Attorney, Agent, or Firm* — Sughrue Mion, PLLC (57) ABSTRACT

Fluid product dispenser having a reservoir (R) with a threaded neck (R1) forming an external helical thread (R2), a closure element (T) having a threaded skirt (F1) forming an internal helical thread (F2), and a band (H) engaging around the threaded skirt (F1). The skirt has tabs (F11), each forming a segment (F21) of the internal helical thread (F2). The fastening member (F) has an angular indexing mechanism for positioning it with respect to the external helical thread (R2) with a determined angular orientation, and the segments (F21) of the internal helical thread (F2) of the threaded skirt (F1) come into corresponding threaded contact with the external helical thread (R2) of the neck (R1) in the final assembly position.

15 Claims, 3 Drawing Sheets

(56) References Cited

U.S. PATENT DOCUMENTS

| | | | | |
|---|---|---|---|---|
| 2009/0283549 A1* | 11/2009 | Beranger | ............ | B05B 11/1049 222/321.7 |
| 2011/0024465 A1* | 2/2011 | Roosel | ................ | B05B 11/1049 222/321.1 |
| 2011/0240679 A1* | 10/2011 | Langlos | .............. | B05B 11/1049 222/321.7 |
| 2012/0068030 A1* | 3/2012 | Behar | ................. | B05B 11/1049 248/224.7 |
| 2013/0118641 A1* | 5/2013 | Beranger | .................. | B65B 3/04 141/383 |

OTHER PUBLICATIONS

International Search Report of PCT/FR2020/000132 dated Jul., 3, 2020 [PCT/ISA/210].

* cited by examiner

FLUID PRODUCT DISPENSER

CROSS REFERENCE TO RELATED APPLICATIONS

This application is a National Stage of International Application No. PCT/FR2020/000132 filed on Apr. 16, 2020, claiming priority based on French Patent Application No. 1904116 filed on Apr. 17, 2019.

The present invention relates to a fluid product dispenser (pasty liquid) comprising a fluid product reservoir provided with a threaded neck and internally defining an opening communicating with the inside of the reservoir. The dispenser further comprises a dispensing head that is mounted on the neck of the reservoir, the head comprising a dispensing member, such as a pump or a valve, a pushbutton for actuating the dispensing member and a fastening member that is in engagement both with the threaded neck of the reservoir and with the dispensing member. Such dispensers are frequently used in the fields of perfumery and cosmetics. By extension, the present invention also applies to a threaded neck pot provided with an unscrewable and rescrewable cap.

Generally, the fastening member comprises a rigid skirt that internally forms one or more threads for engaging with the threaded neck of the reservoir. In order to put the dispensing head into place on the reservoir, it suffices to screw the threaded-skirt fastening member on the threaded neck of the reservoir. Subsequently, the fastening member can be removed from the neck by unscrewing, then again put back in place on the neck by screwing.

In the prior art, document WO 2009/150351A1 is known, which describes a dispenser comprising a reservoir forming a threaded neck and a dispensing head mounted on the neck of the reservoir. The head comprises a pump or a valve, a pushbutton, a fastening member engaging both with the threaded neck and the pump or valve. The fastening member comprises a deformable and malleable skirt intended to engage with the threaded neck and a rigid band engaged around the skirt to radially push the skirt against the threaded neck, so as to deform the skirt against the thread of the neck to create a thread imprint in the skirt.

The skirt of this document WO2009/150351A1 comprises tabs which form inner ribs elongated in the axial or vertical direction. The rigid band pushes the inner ribs against the threads of the neck, thereby biting them into the inner ribs, so as to form a negative imprint of the neck threads. The fastening on the neck is fully ensured and it is further possible to unscrew this fastening member from the neck in order to have access to the inside of the reservoir.

However, it has been noted that it is difficult to screw this fastening member back onto the neck. Often, it gets crooked and no longer seals. In addition, this system requires the wear of a glass neck often with the wear of a specific thread geometry.

The present invention aims to overcome the abovementioned disadvantages of the prior art by defining a fluid product dispenser, the fastening member of which is initially mounted on a threaded neck without screwing, can be unscrewed, but can also be screwed in a functional and optimum manner, whatever the material of the neck.

To do this, the present invention proposes a fluid product dispenser comprising:
- a fluid product reservoir provided with a threaded neck forming at least one external helical thread and an annular upper edge,
- a dispensing head mounted on the neck of the reservoir, the head comprising a dispensing member, such as a pump or a valve, a pushbutton to actuate the dispensing member and a fastening member in engagement both with the threaded neck of the reservoir and the dispensing member, the fastening member comprising a threaded skirt forming at least one helical thread, the fastening member also comprising a band which engages with a clamping action around the threaded skirt, wherein:
- the fastening member comprises angular indexing means for positioning it with respect to the external helical thread of the neck with a determined angular orientation, and
- the internal helical thread segments of the threaded skirt comes into corresponding threaded engagement with the external helical thread of the neck in the final assembly position.

Given that the fastening principle of the invention is based on a close and corresponding interlocking of the respective threads of the neck and of the skirt during the axial mounting of the fastening member on the threaded neck, it is necessary to engage the skirt around the threaded neck with a suitable orientation which allows to reach the desired final assembly position. This orientation can, for example, be made on a packaging line by camera control and/or mechanical guiding. Given that the fastening member is generally a revolving part, it is advantageous to create a revolving break allowing to angularly orient it. It is specifically the function of the angular indexing means, which can be presented in various forms, which are often visible, like a localised marking or a localised characteristic, for example a shorter, narrower or wider tab.

In other words, the fastening member of the invention has the same characteristics as a conventional fastening member to be screwed/unscrewed, however with this additional characteristic consisting of the segmentation of the skirt in order to obtain tabs which have a degree of freedom in the radial direction, allowing to engage the tabs around the threaded neck in a pure axial movement, without rotating. The mounting principle is identical to that of document WO2009/150351A1, but the fastening principle is different, in that it does not cause any deformation of the skirt, but the close interlocking of the corresponding threads of the neck and of the skirt, thanks to the angular indexing means for positioning them with a very high precision with respect to the external helical thread of the neck with a determined angular orientation. This allows, in particular, to mount the fastening member of the invention on plastic necks, which is not possible with the fastening member of document WO2009/150351A1, which requires a glass neck to mark the imprint in the skirt by moving or creeping material. In the present invention, the skirt and the neck can be made with materials of identical hardness, and without needing any particular thread geometry.

Advantageously, the fastening member can comprise a continuous upper crown from which the pads extend. The continuous upper crown is rigid, while the tabs, due to their mutual independence, can be deformed and/or moved radially outwards or inwards. The tabs can be flexible or rigid.

According to an advantageous embodiment, the tabs are connected to the continuous upper crown by hinges, allowing a radial pivoting of the tabs around respective tangential axes. The tabs can thus have a significant rigidity, their radial movement being fully ensured by the hinges. In a variant, the pads can be flexible.

Thanks to the hinges, the amplitude of movement of the tabs is significant, for example around 90 degrees. This allows to mould the fastening member with the tabs extended radially outwards, in an overall flat star-shaped or flower-shaped configuration. The depth and the precision of the internal thread segments of the tabs can thus increase. In addition, the tabs can be demoulded without forceful unpinning, which allows to not damage them and therefore preserve their elevation at the level of the thread segments. The engagement with the threaded neck is improved due to this, which guarantees an unscrewing and in particular an easy rescrewing. This is truer when the tabs are rigid and behave, once folded and clamped by the band against the threaded neck, as if the skirt was continuous.

According to a practical embodiment, the hinges can define two stable extreme positions and an unstable intermediate position, the two stable extreme positions comprising an initial mould exit position, wherein the tabs extend radially outwards substantially at a right angle with respect to the continuous upper crown and a final assembly position wherein the tabs extend axially downwards substantially in the extension of the continuous upper crown. The tabs can therefore be moulded flat and folded around the neck before the engagement of the band around the tabs to finalise the close corresponding contact of the threads of the neck and of the skirt. The two stable extreme positions ensure that the tabs are all in the same position and orientation once folded around the neck.

According to another aspect, the hinges can have a width which is less than that of the tabs. This is all the more valid that the number of tabs is reduced. With a four-tab skirt for example, each tab extends over a quarter-circle. It is thus understood that its hinge cannot extend over a quarter-circle, since it must define a substantially rectilinear pivoting axis. Consequently, the hinge will only extend over one eighth of a circle, for example.

According to another interesting characteristic, the tabs can be connected together by flexible walls, which are advantageously separated from the continuous upper crown. These walls, that can also be qualified as membranes, sheets, films, are by definition, very thin and due to this, very flexible. They are deformed under very low stresses, and in particular when the tabs are folded from their mould exit position to their axial mounting position. The walls partially or totally fill the spaces between the tabs. Preferably, the walls remain withdrawn from the upper crown to not impede the functioning of the hinges. The walls can be summarised as strip segments connecting the ends of the tabs. The main function of these walls is to restrict the fastening risks of the fastening member between the tabs. Without these walls, a dip tube could, for example, be wedged between the tabs or between a tab and the upper crown. The tabs of two or more fastening members could be entangled. With these walls, the tabs are attached and thus form a complete ring in the mould exit position. And once the tabs are folded, the walls crease and remain deformed without impeding the subsequent unscrewing and rescrewing.

According to another characteristic, it is considerable during mounting, to radially lower the rigid band H on the tabs to an intermediate position located under the hinge in order to fold the tabs at around 45° in a position more favourable to transport and to dispensing into a vibrating bowl, for example.

According to an advantageous characteristic, the angular indexing means are presented, for example, in the form of a tab which is different from the others. In a variant or complementary to the angular indexing means, it is also possible to play on the more or less strong flattening of the neck joint disposed on the upper edge of the neck to reach the final assembly position.

According to an embodiment, the closure element comprises a dispensing member, such as a pump or a valve and a pushbutton to actuate the dispensing member. The fastening member and the band thus serve to mount the pump or the valve on the threaded neck of the reservoir. In a variant, the closure element can be a stopper or a cap intended to be associated with a pot.

The invention also defines a method for mounting a dispenser such as defined above, comprising the following successive steps:
  a) depositing, advantageously by gravity, the fastening member on the neck,
  b) angularly orienting the fastening member (F; F') on the neck (R1), in order to ensure the corresponding close threaded engagement in the final assembly position, and
  c) engaging the band around the skirt to bring the segments of the internal helical thread of the tabs into corresponding close threaded engagement with the external helical thread of the neck.

And when a neck seal is disposed on the annular upper edge of the neck, the preceding step of angular orientation considers the optimal flattening of the neck seal.

Advantageously, before or during step c), the tabs are folded around the neck from an initial position, wherein they extend radially flat outwards.

Advantageously, before or during step c), the tabs are brought around the neck in an intermediate position, forming a angle of around 0.5° to 45° with respect to the final assembly position, the tabs being advantageously stressed in this intermediate position by the band or an axial thrust element, which can form an integral part of a mounting station.

Optionally and if necessary, after step c), a final screwing torque is exerted on the fastening member to guarantee an optimal interlocking of the segments of the internal helical thread of the tabs with the external helical thread of the neck. This does not relate to screwing the fastening member on the neck, but is simply about ensuring the quality of the interlocking, in most cases, the final screwing torque will not cause any screwing movement.

The invention also defines a mounting installation or station to implement the mounting method defined above, comprising:
  depositing means for depositing the fastening member on the neck,
  angular orientation means for angularly orienting the fastening member on the neck, in order to ensure the corresponding close threaded engagement in the final assembly position, and
  axial thrust means acting directly on the band (H), and optionally first on the tabs (F11; F11') of the skirt (F1), for engaging the band around the skirt, in order to bring the segments of the internal helical thread of the tabs into corresponding close threaded engagement with the external helical thread of the neck. These thrust means can comprise an axial thrust element which only acts on the band, or in a variant, first on the tabs and then on the band.

This mounting station is distinguished from a conventional station by the presence of angular orientation means between the fastening member and the neck, and more specifically, between the threading of the skirt and the threading of the neck.

The scope of the present invention resides in the action of splitting a conventional threaded skirt in order to give it a sufficient deformability to be able to engage it axially without screwing on a threaded neck. The prior angular orientation of the fastening member allows to reach the final assembly position rapidly and optimally. The flat moulding of the tabs allows to increase the quality of the internal thread segments. The walls decrease the problems with packaging and transit, in particular during the assembly operation of the dispenser. All these characteristics contribute to a good quality mounting, while improving the unscrewing operation and in particular, the rescrewing operation by the consumer.

The invention will now be described more fully with reference to the accompanying drawings, which show an embodiment of the invention by way of non-limiting example.

Figure 1:
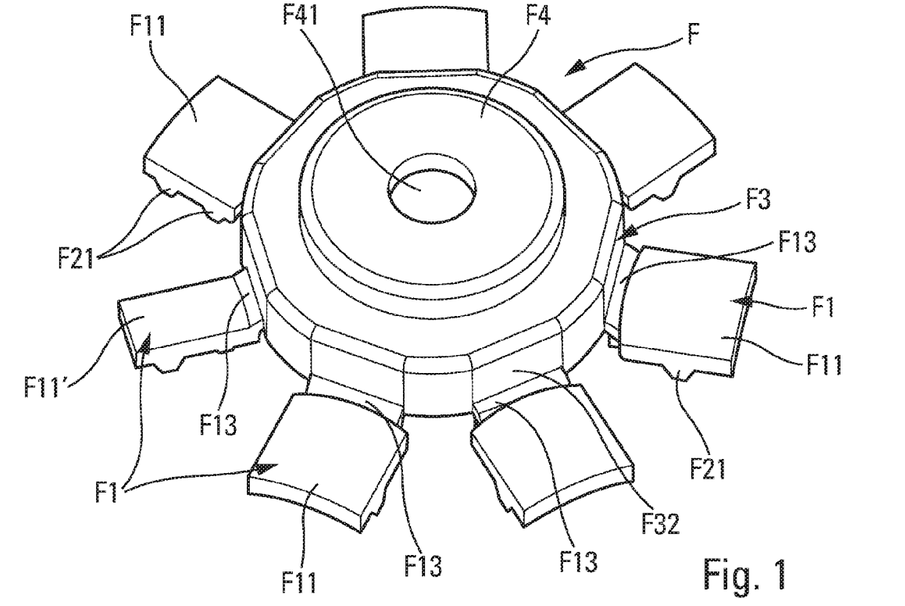
FIG. 1 is a highly enlarged top, perspective view of a fastening member according to the invention.
Figure 2:
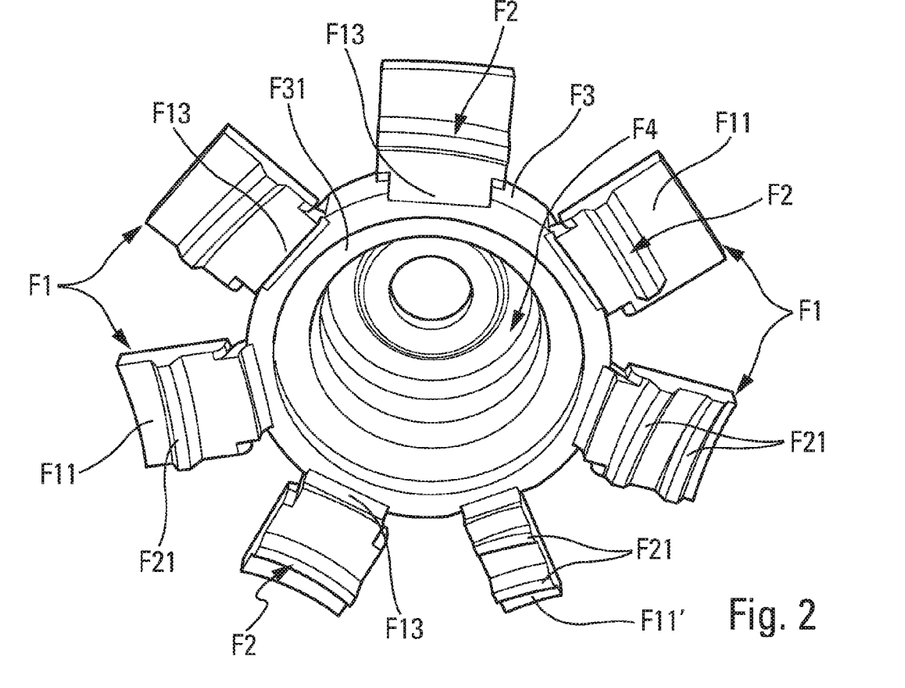
FIG. 2 is a bottom view, similar to that of FIG. 1.

First, FIGS. 1 and 2 will be referred to, to describe in detail, the structure of a fastening member F according to the invention. This member is represented in these Figures in the initial moulding position, i.e. in the mould exit configuration. The mould (not represented) can be a very simple mould with two shells in axial movement. Due to this, the demoulding of the fastening member F is done without forceful unpinning, which allows to guarantee the integrity and the precision of all the elevations of the fastening member F.

The fastening member F comprises a receiving housing F4, wherein a dispensing member can be fixedly received, in particular by snap-fitting. This receiving housing F4 comprises a central opening F41 for the passage of the actuation rod of the dispensing member as can be seen below.

The fastening member F also comprises a crown F3 which continuously extends around the receiving housing F4. This crown F3 internally defines an annular plate F31, the function of which will be given below.

The fastening member F also comprises several tabs F11 which are connected to the continuous crown F3 by hinges F13. More specifically, the hinges F13 connect the inner edges of the tabs F11 to the lower periphery of the continuous upper crown F3. In FIGS. 1 and 2, the fastening member F comprises seven tabs F11. They extend in the initial flat moulding position radially outwards, such that the fastening member has an overall star-shaped or flower (daisy)-shaped configuration. It can be noted that the tabs form, on their internal face, internal helical thread segments F21. Certain tabs form one single segment F21, while other tabs can form two segments F21 or more. The segments F21 are designed to together form one or more continuous helical threads F2, once the tabs F11 are folded downwards in an axial orientation to all together form a split skirt F1. It can thus be said that the split skirt F1 internally comprises one or more continuous helical threads F2 formed by all the segments F21 of the tabs F11.

It can also be noted in FIGS. 1 and 2, that the hinges F13 are narrower than the tabs F11, in order to facilitate their pivoting downwards. Indeed, the hinges F13 can only extend over a reduced portion of the annular periphery of the crown F3. In FIG. 1, it can easily be noted that the external crown wall F3 is formed with flat facets F32 at the level of which the hinges F13 are disposed. Thus, each hinge F13 defines a horizontal axis which extends tangentially to the crown F3. The tabs F11 can thus pivot downwards from their initial moulding position, wherein they extend flat radially outwards.

It can also be noted that the tabs F11 are not flat, but have a curve which allows them, once folded downwards, to together form the skirt F1, which is substantially cylindrical both outwards and inwards. This means that the segments F21 extend along a curved wall, and not flat.

The tabs F11 can be identical, but preferably a tab F11' is different from the others, so as to break the revolving symmetry. It can be seen that this tab F11' is narrower than the others. Its hinge F13 can be identical to the others, as well as its length. This tab F11' of reduced width thus forms angular indexing means, allowing to orient the fastening member F with a determined angular orientation. This tab F11' constitutes a non-limiting embodiment for these angular indexing means. Indeed, whichever localised characteristic can serve as a marker for an angular orientation. This characteristic can be placed at the level of the tabs F11, or otherwise at the level of the crown F3 or of the receiving housing F4. This angular indexing marker can be disposed on the upper face or on the lower face of the fastening member F.

The hinges F13 allow a pivoting of the tabs F11 downwards from the initial moulding position over an angle of around 90°. The initial moulding position is the favoured position, given that it corresponds to the rest position. The tabs F11 can therefore be folded downwards by pivoting by exerting a deformation stress on the hinges F13. Preferably, the tabs F11 do not undergo deformation during this pivoting. The final assembly position, wherein the tabs F11 are axially folded in the extension of the external wall of the crown F3, can be an unstable position resulting from the deformation of the hinge F13.

In a variant, the hinges F13 can be of a particular type, having two stable extreme positions, namely the initial moulding position and the final assembly position, and an unstable intermediate position. In other words, the tabs F11 remain in these two horizontal and vertical extreme positions without exerting any stress on them. However, all the intermediate positions are unstable and return the tabs automatically either into the horizontal moulding position, or into the vertical mounting position.

The hinges F13 can also have an axial deformability which allows to slightly move the tabs F11 in the axial direction such that they reach their final assembly position.

Figure 3:
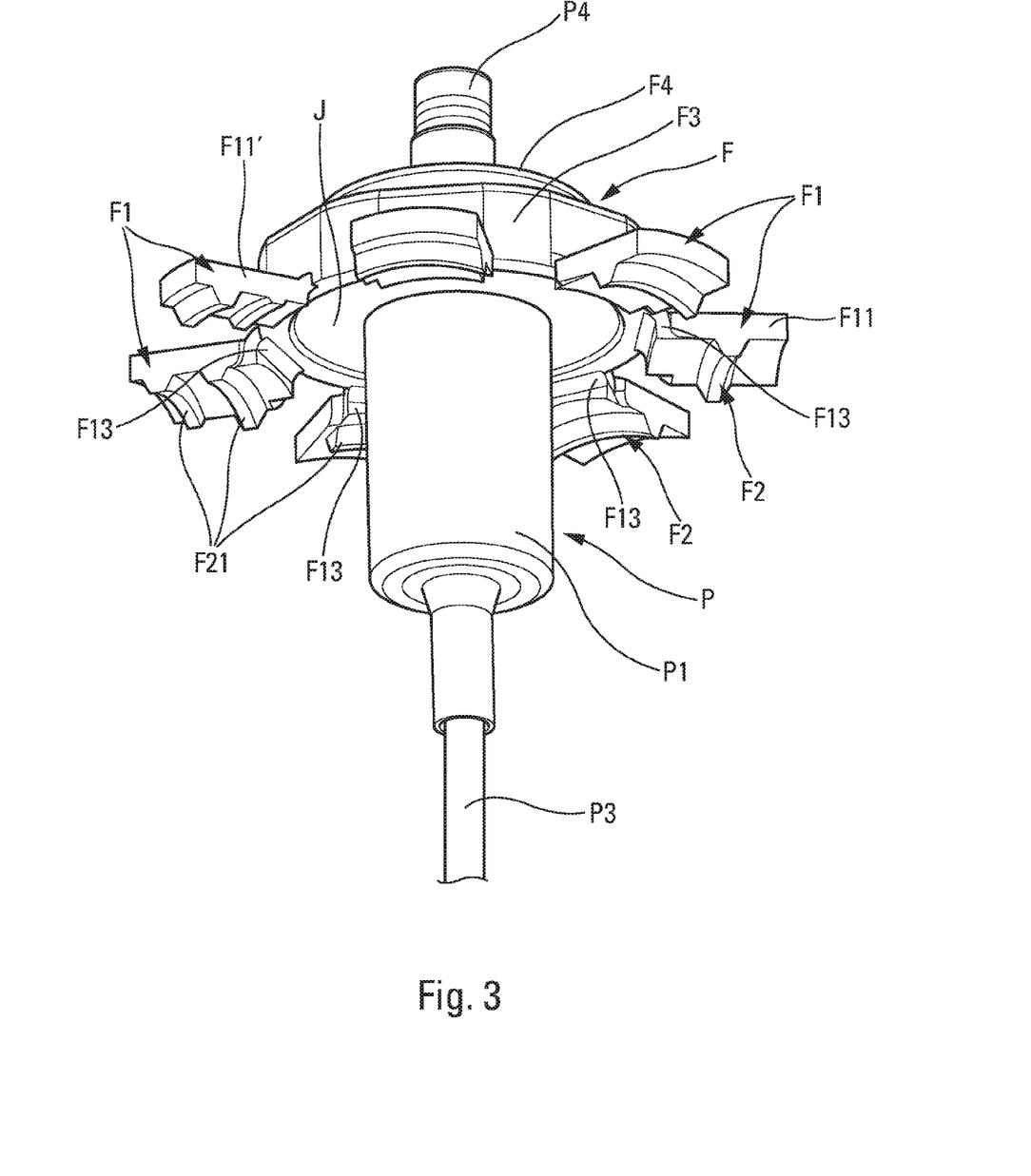
FIG. 3 is a slightly bottom view of the fastening member of FIGS. 1 and 2 associated with a dispensing member.

In FIG. 3, the fastening member F of FIGS. 1 and 2 can be seen, associated with a dispensing member P, which can be a pump or a valve. This dispensing member P comprises a body P1 which is engaged in the fastening member F, and more specifically in its receiving housing F4. The body P1 comprises a dip tube P3. The dispensing member P also comprises an actuation rod P4 which is axially movable back and forth inside the body P1. The actuation rod P4 passes through the central opening F41 of the receiving housing F4. Here, this relates to absolutely conventional and common characteristics for a pump or a valve. The dispensing member P will not be described in more detail, as it does not constitute a critical element for the present invention. It can also be noted in FIG. 3, that a neck seal J is disposed around the body P1 of the dispensing member P supported on the plate F31 of the fastening member F.

This assembly, constituted of the fastening member F, of the dispensing member P and possibly of the neck seal J, is ready to be mounted on a threaded neck of a fluid product reservoir.

Figure 4A:
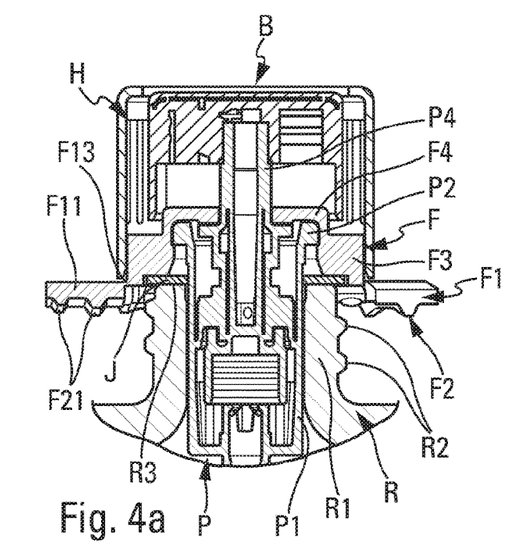
FIGS. 4a and 4b are vertical, transverse cross-sectional views through a dispenser according to the invention, respectively before and after mounting.
Figure 4B:
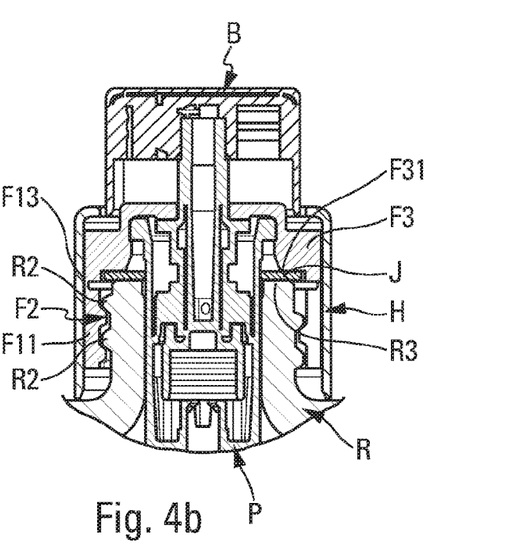

Now, FIGS. 4a and 4b will be referred to, to show in which way the fastening member F of the invention engages with the reservoir threaded neck. In these Figures, only the upper part of a fluid product reservoir R can be seen, comprising a threaded neck R1 defining one or more external helical threads R2, as well as an upper annular edge R3. These characteristics are entirely conventional for a fluid product reservoir in the fields of perfumery or cosmetics. The reservoir R can be made from any suitable material, like for example glass, a plastic material, metal, ceramics, etc. In these Figures, it can also be noted that the dispensing member P comprises a projecting upper collar P2 which is engaged, in particular by snap-fitting, inside the receiving housing F4. It can also be noted that the actuation rod P4 is topped with a pushbutton B, which defines a dispensing orifice. The fastening member F has been completed by a band F which is engaged around the crown F3. The tabs F11 extend flat radially outwards and the lower edge of the band H comes into contact with the hinges F13. The band H can be held by friction around the crown F3. The neck seal J is disposed on the upper annular edge R3 of the neck R1. In this configuration represented in FIG. 4a, the tabs F11 extend around the upper edge R3 of the neck R1. The external thread R2 of the neck R1 is completely released. The neck seal J is not still compressed.

From this initial mounting position, the tabs F11 are folded downwards, either using an external thrust element, or using the band H. In one way or another, the band H is engaged around the tabs F11 to bring their respective segment F21 of internal thread in corresponding and close contact with the external thread R2 of the neck R1. The final assembly position is represented in FIG. 4b. The band H extends around the tabs F11 and its lower edge can even come into contact with the reservoir R. The neck seal J is compressed between the upper edge R3 and the plate F31. The tabs F11 thus folded all together form a skirt F1, which is not continuous, but split, on the contrary. The thread segments F21 all together form an internal helical thread F2 which is in close and corresponding threaded engagement with the external thread R2 of the neck R1. In the final assembly position represented in FIG. 4b, the tabs F11 can come into joint contact, or on the contrary, remain separated by an axial split. The neck seal J is compressed optimally to achieve a sealing.

The corresponding and optimal interlocking of the two threads F2 and R2 can be obtained by playing on the compression of the neck seal J and/or on the axial elasticity of the hinges F13 which allow(s) a relative axial movement between the skirt F1 and the neck R1. In a preferably variant, this optimal correspondence of the threads is obtained by orienting beforehand the fastening member F with respect to the neck R1. This angular orientation can be done by means of the tab F11' or of any other angular indexing means provided at the level of the fastening member F. In practice, the optimal angular orientation of the fastening member F with respect to the neck R2 is determined or calculated, such that their respective threads F2 and R2 are interlocked optimally, with an also optimal flattening of the neck seal J. Of course, the compression of the neck seal J and/or on the axial elasticity of the hinges F13 can also contribute to the optimal correspondence of the threads.

Figure 5:
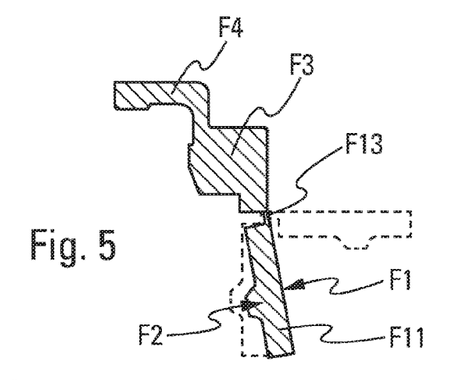
FIG. 5 is a schematic, vertical, transverse cross-sectional view of the fastening member illustrating the tabs in different positions.

FIG. 5 is a very schematic view aiming to show the positions that the tabs F11 can take. It has already been seen, in reference to FIGS. 1 to 3, that the tabs extend initially flat radially outwards exiting the mould. From this initial position, the tabs are folded and can adopt a pre-mounting position represented as a solid line in FIG. 5. This intermediate position can be obtained by a partial descent of the band H slightly beyond the hinges F13. The tabs F11 can thus extend with an angle of around 0.5° to 45° with respect to the vertical, corresponding to the final assembly position. This orientation is more favourable to the transport and to the dispensing into a vibrating bowl, for example. In a variant, this intermediate position can be a stable position of the hinges F13.

The fastening member F can thus be mounted on the threaded neck and the tabs F11 are then pushed radially inwards by the band H to take their final assembly position wherein they extend vertically in the extension of the crown F3.

According to another mounting variant, the intermediate position (0.5° to 45° with respect to the vertical) can be reached during mounting, by using an axial thrust element which forms an integral part of a mounting station. This axial thrust element, during one single and same axial movement downwards, can first act directly on the tabs F11 to bring them into the intermediate position, then act on the band H to bring the tabs into the final assembly position. The only action of the band H on the tabs is a preferred option, but in certain cases, the mounting variant combining the axial thrust element and the band can be implemented.

Figure 6:
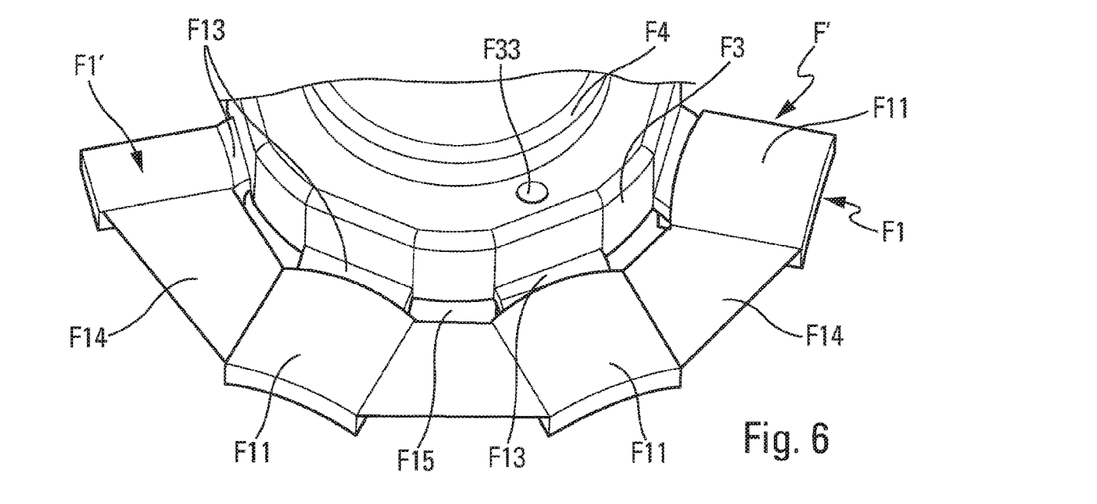
FIG. 6 is a partial view, similar to that of FIG. 1 for an embodiment variant.

FIG. 6 shows an embodiment variant for the fastening member. In this fastening member F1', the receiving housing F4 and the continuous upper crown F3, as well as the tabs F11, can be identical or similar to the first embodiment. However, the angular indexing means are presented here in the form of a hole F33 at the level of the crown F3. The tabs F11 can thus be all identical. The hinges F13 can also be identical to those of the first embodiment. The main difference of this embodiments resides in the fact that the tabs F11 are connected by walls F14. These walls are very thin and connect the adjacent edges of the tabs F11. The walls F14 can have a trapezium shape, given that the tabs F11 are substantially rectangular and extend radially. The walls F14 extend advantageously to the level of the external edges of the tabs F11, so as to create a continuous perimeter without a recess. The walls F14 can extend to the level of the crown F13, but preferably, they stop before, so as to create a small elongated window F15 bordered by two hinges F13. These windows F15 allow to disconnect the walls F14 from the crown F3, so as to not create any impediment for the functioning of the hinges F13. The walls F14 extend inwards to the level of the inner edges of the tabs F11. In a variant not represented, the walls F14 can be limited to a thin strip or blade which connects the external edges of the tabs F11. Thus, the window F15 would be larger. The main function of these walls F14 is to fill the spaces between the tabs F11 so as to constitute a continuous annular collar, which minimises the fastening risks, in particular of the fastening members together or of a fastening member with a dip tube. The walls F14 also allow to create a link between the tabs F11, such that they all behave identically. Indeed, thanks to the tabs F14, the tabs F11 are either all in the initial moulding position, or all in the final assembly position. The walls F14 are sufficiently thin and flexible to not impede the folding of the tabs F11 downwards. They will deform and/or crease without excessive stress. The walls F14 are preferably formed at the level of the external wall of the tabs F11 so as to not impede the interlocking of the threadings F2 and R2.

Thanks to the fastening member of the invention, a dispensing member P can be mounted on a threaded neck R1 of a reservoir F during a movement which does not comprise any rotary component. The tabs F11 of the skirt F1 are simply folded around the threaded neck R1 without screwing movement. The band H allows to hold the tabs F11 in the folded configuration so as to form a cylindrical skirt F1 with an internal thread F2. The band H also contributes to the close and corresponding interlocking of the respective threads F2 and R2. Once this mounting operation has ended, the user can use the dispenser until its reservoir is empty. The user can then unscrew the fastening member absolutely conventionally without any difficulty, given that the internal thread F2 is of very good quality, since the tabs F11 have been moulded flat without forceful unpinning. The rescrewing of the fastening member will also be very easy, as the threading F2 is projecting and precise.

According to another embodiment not represented, the reservoir can be a pot defining a threaded neck of increased diameter, on which is mounted a threaded stopper or cap constituted by integrating a fastening member and a band of the invention. In this case, the fastening member has no receiving housing and the band can be presented in the form of a cover which fully covers the fastening member.

Whether this is a pump bottle, an applicator-type collection device, or a pot with a cap, the fastening member forms an integral part of a closure element which blocks the threaded neck reservoir. The fastening member is initially mounted on the threaded neck without any rotary component, but can subsequently be unscrewed, then rescrewed. The unscrewing/rescrewing operations can aim to be able to fill the fluid product reservoir again, in a scope of durability or also to access the fluid product from the reservoir by removing a cap or an applicator. The removal of the cap can also give access to an applicator integral with the reservoir.

The invention has been described with an embodiment wherein the fastening member F comprises seven tabs F1. Without moving away from the scope of the invention, a fastening member of the invention can also be imagined comprising only three tabs, even two tabs, or on the contrary, more than seven tabs. Although the flat moulding of the tabs F11 is preferred, it is also possible to consider a fastening member of which the tabs F11 would be moulded in an arrangement forming an angle of 5° to 45° with respect to the final mounting position. The band H has been represented here as forming a visible external element, but it can also be formed by an internal element of the dispenser. The reservoir R of the Figures is a bottle with a threaded neck of reduced diameter.

Optionally and if necessary, after having reached the final assembly position is represented in FIG. 4b, a final screwing torque can be exerted on the fastening member F to guarantee an optimal interlocking of the segments of the internal helical thread of the tabs with the external helical thread of the neck. This does not relate to screwing the fastening member on the neck, but is simply about ensuring the quality of the interlocking, in most cases, the final screwing torque will not cause any screwing movement.

In order to implement the mounting method defined above, a mounting installation or station can be used, comprising:

- depositing means for depositing the fastening member F on the neck R1,
- angular orientation means for angularly orienting the fastening member F on the neck R1, in order to ensure the corresponding close threaded engagement in the final assembly position, and
- axial thrust means for engaging the band H around the skirt F1, in order to bring the segments F21 of the internal helical thread F2 of the tabs F11 in corresponding close threaded engagement with the external helical thread R2 of the neck R1. The axial thrust means can act only and directly on the band, or in a variant, first on the tabs and then on the band to make the tabs pivot from their initial position, advantageously flat, until in their final assembly position.

The mounting station can identify the thread leaving the neck. This operation can be done mechanically or optically to identify the height of the thread with respect to a reference point, on each bottle, before the pump deposition, to define the optimal angular orientation of the pump for the deposition. The gravity deposition of the pump on the neck of the bottle can be done without pressing on the pump. The pump remains in close contact with the neck to the assembly station.

The mounting station can identify the position of the fastening member. This operation can be ensured, either mechanically or optically from the top, once the pump is placed on the neck, to identify the tab of the shortest insert, or more generally, any geometric element and/or colour of the insert which could serve as a poka-yoke or indexing.

The mounting station can angularly orient from the pump: Once the pump is placed on the neck, an angular movement is made with a low screwing inertia to place the pump in the most suitable position with respect to the thread entry of the bottle.

The mounting station can thus proceed with the drawdown and with the locking of the tabs: the band H sinking tool is quite close to that of a shut-off pump. The sinking tool exerts an axial thrust downwards by pressing on the tabs and then on the top of the band. This force generates a movement secondly with a pre-closure at the level of the flexible hinges F13 of the tabs which tilt from the position 0° to 90° on the thread R2 of the neck, then by the complete sinking of the band H which locks the tabs F11 of the skirt F1.

The mounting station can optionally adjust the screwing/clamping torque: it is possible to consider, at the end of mounting, a slight torquing of the fastening member (via the band H) with a low screwing inertia, to guarantee an optimum compression of the neck seal J, and an acceptable unscrewing torque for the user.

Thanks to the invention, both a rapid online mounting, and a qualitative unscrewing/rescrewing are guaranteed, to make the product refillable by the user, while remaining sealed. To do this, the tabs of the insert are preferably injected flat to facilitate the demoulding and the precision of the shapes of the thread segments. This point is advantageous for ensuring a good suitability and interlocking of the threads of the insert on those of the neck, by considerably limiting the creeping and the deformation of the threads of the insert during mounting, unscrewing and rescrewing operations. The industrial method ensures, by mechanical and/or optical marking, a perfect angular indexing between the thread of the skirt and that of the neck. This indexing precision guarantees a good holding of the pump on the bottle, a good unscrewing and rescrewing of the pump, and a controlling of the compression of the neck seal to ensure the sealing of the pump on the bottle.

The invention claimed is:

1. A fluid product dispenser comprising:
   a fluid product reservoir provided with a threaded neck forming at least one external helical thread and an annular upper edge,
   a fastening member comprising a threaded skirt forming at least one internal helical thread, the closure element also comprising a band which engages with a clamping action around the threaded skirt, the threaded skirt comprising several tabs each forming a segment of the internal helical thread,
   wherein:
   the fastening member comprises angular indexing means for positioning the fastening member with respect to the external helical thread of the threaded neck with a determined angular orientation, and
   the internal helical thread segments of the threaded skirt comes into corresponding threaded engagement with the external helical thread of the threaded neck in the final assembly position.

2. The fluid product dispenser according to claim 1, wherein the angular indexing means are presented in the form of a tab different from the others.

3. The fluid product dispenser according to claim 1, wherein the fastening member comprises a continuous upper crown from which the tabs extend.

4. The fluid product dispenser according to claim 3, wherein the tabs are connected to the continuous upper crown by hinges, allowing a radial pivoting of the tabs (F11, F11') around respective tangential axes.

5. The fluid product dispenser according to claim 4, wherein the hinges define two stable extreme positions and an unstable intermediate position, the two stable extreme positions comprising a mould exit initial position, wherein the tabs extend radially outwards substantially at a right angle with respect to the continuous upper crown and a final assembly position wherein the tabs extend axially downwards substantially in the extension of the continuous upper crown.

6. The fluid product dispenser according to claim 4, wherein the hinges (F13) have a width which is less than that of the tabs.

7. The fluid product dispenser according to claim 4, wherein the tabs are connected together by flexible walls, which are advantageously separated from the continuous upper crown.

8. The fluid product dispenser according to claim 1, wherein the closure element comprises a dispensing member, such as a pump or a valve and a pushbutton to actuate the dispensing member or a collection device, such as an applicator.

9. The fluid product dispenser according to claim 1, wherein the threaded neck is made of plastic material.

10. A method for mounting a fluid product dispenser according to claim 1, comprising the following successive steps:
    a) depositing the fastening member on the threaded neck,
    b) angularly orienting the fastening member on the threaded neck, in order to ensure the corresponding close threaded engagement in the final assembly position, and
    c) engaging the band around the threaded skirt to bring the segments of the internal helical thread of the tabs into corresponding close threaded engagement with the external helical thread of the threaded neck.

11. The mounting method according to claim 10, wherein a neck seal (J) is disposed on the annular upper edge (R3) of the threaded neck (R1), the preceding angular orientation step considering the optimal flattening of the neck seal (J).

12. The mounting method according to claim 10, wherein, before or during step c), the tabs are folded around the threaded neck from an initial position wherein they extend flat radially outwards.

13. The mounting method according to claim 10, wherein, before or during step c), the tabs are brought around the threaded neck into an intermediate position, forming an angle of around 0.5° to 45° with respect to the final assembly position, the tabs being stressed in this intermediate position by the band or an axial thrust element.

14. The mounting method according to claim 10, wherein, after step c), a final screwing torque is exerted on the fastening member to guarantee an optimal interlocking of the segments of the internal helical thread of the tabs with the external helical thread of the threaded neck and an optimum compression of a neck seal on the annular upper edge to ensure the sealing of the dispensing system.

15. A mounting station for implementing the mounting method of claim 10, comprising:
    depositing means for depositing the fastening member on the threaded neck,
    angular orientation means for angularly orienting the fastening member on the threaded neck, in order to ensure the corresponding close threaded engagement in the final assembly position, and
    axial thrust means acting directly on the band, and optionally first on the tabs of the threaded skirt, for engaging the band around the threaded skirt, in order to bring the segments of the internal helical thread of the tabs into corresponding close threaded engagement with the external helical thread of the threaded neck.

* * * * *